United States Patent Office 3,404,151
Patented Oct. 1, 1968

3,404,151
NOVEL HYDROXYL AMINE TRIAZINE COMPOUNDS AND PROCESS FOR PRODUCING THE SAME
Werner Heimberger, Hanau am Main, Germany, assignor to Deutsche Gold- und Silber-Scheideanstalt vormals Roessler, Frankfurt am Main, Germany
No Drawing. Filed Oct. 3, 1966, Ser. No. 583,996
3 Claims. (Cl. 260—249.8)

The present invention relates to novel hydroxyl amine derivatives of triazine compounds of the formula

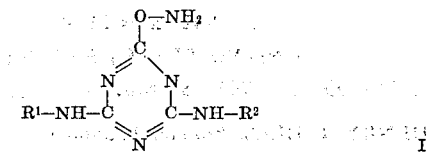

I in which $R^1$ and $R^2$ may be the same or different lower alkyl radicals and a process for their production.

Direct alkylations of hydroxyl amine are known, but they always have led to substitution on the nitrogen atom. If a substitution of hydroxyl amine is to be effected at the hydrogen atom of the hydroxyl group, it is necessary first to protect the amine function with an easily saponifiable group. For instance the oximes or hydroxamic acid or its esters can be employed for this purpose (Chimia 18, 1964, page 1).

In addition there are other methods, for example, the Meisenheimer rearrangement, which are known, for obtaining the oxygen substituted derivatives of hydroxyl amine. In this instance also, only intermediate products are first produced from which the free O-substituted derivative must be obtained in a separate step (Angew. Chem. 68, 1956, page 303). These processes only produce low yields and cannot be applied generally. A direct conversion of hydroxyl amine to O-substituted derivatives which at least have one hydrogen atom on the nitrogen atom has not previously been described.

According to the invention it was unexpectedly found that novel hydroxyl amine derivatives of triazine compounds of the above Formula I can be obtained by reacting a quaternary ammonium compound of the formula

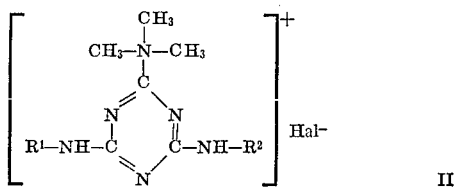

II wherein $R^1$ and $R^2$ have the same significance as above and Hal is halogen, preferably chlorine, with at least an equimolar quantity of hydroxyl amine in water at a temperature between 0° C. and 50° C., preferably at room temperature. The preparation of the starting quaternary ammonium compounds of Formula II has been described in Austrian Patent No. 174,377.

The novel compounds produced by the process according to the invention can be recovered from the reaction mixture by known methods. They are valuable intermediates for other syntheses and also can be used directly as antiphlogistic agents.

The following table illustrates the antiphlogistic action of representative compounds of the novel compounds according to the invention (determined on albumen edema of the rat paw according to the method of Domenjoz et al., Arch. Exp. Pharm. Path. 230, 325 (1957). The administration was oral and the antiphlogistic action is indicated in the edema arresting action in percent as compared to a control group. Such table also indicates the acute toxicity ($LD_{50}$ mg./kg.) on oral administration to rats determined according to the method of Miller and Tainter, Proc. Soc. Exper. Biol. and Med. 57, 261 (1944) with a period of observation of 24 hours.

| | Albumen edema restraint in percent upon adm. 300 mg./kg. oral | $LD_{50}$ mg./kg. oral |
|---|---|---|
| D-9260 | 26.4 | Ca. 3,000 |
| D-9634 | 58.3 | 1010±121 |
| D-9635 | 47.8 | 1500±127 |

D-9260 = Compound of Example 1.
D-9634 = Compound of Examples 2 and 3.
D-9635 = Compound of Example 4.

The following examples are illustrative of the novel compounds according to the invention and their production.

Example 1

28.8 g. (1/10 mol) of 2,4-bis-i-propyl-amino-6-trimethyl ammonium-s-triazine chloride were dissolved in 100 ml. of water at room temperature. Then a solution of 13.8 g. (2/10 mol) of hydroxyl amine hydrochloride in 100 ml. of 2-N NaOH (having its pH adjusted exactly to 7) were added to said first solution. This mixture was then freed of the trimethylamine liberated during the reaction by a two hours' treatment under vacuum at 30° C. Upon further concentration of the concentrated solution thus obtained a crystalline mixture separated out which was filtered off, washed with water and dried at 30° C. The dried product contained the 6-hydroxy-triazine compound as an impurity. The desired hydroxyl amine derivative of the triazine was separated with the aid of hot ethyl acetate from the hydroxy derivative which is insoluble in such solvent. The desired hydroxyl amine derivative was obtained analytically pure upon concentration of such ethyl acetate extract. The yield was 17.6 g. of 77.8% of theory. Its melting point was 113° C. (with decomposition).

Example 2

26 g. (1/10 mol) of 2,4-bisethyl-amino-6-trimethyl ammonium-s-triazine-chloride were dissolved in 50 ml. of water at room temperature and a solution of 6.9 g. (1/10 mol) of hydroxyl amine hydrochloride in 50 ml. of 2-N NaOH, the pH of which had been adjusted to 7, added thereto. After six hours' standing at room temperature the crystals which had formed were filtered off and washed with water. After processing as in Example 1, the desired hydroxyl amine derivative was obtained in a yield of 12.7 g. or 60% of theory. Its melting point was 120° C. (with decomposition).

Example 3

26 g. (1/10 mol) of 2,4-bisethyl-amino-6-trimethyl ammonium-s-triazine chloride were dissolved in 100 ml. of water at room temperature and a solution of 6.9 g. (1/10 mol) of hydroxyl amine hydrochloride in 50 ml. of 2-N NaOH, the pH of which had been adjusted to 7 and to which 8.2 ml. of pyridine had been added, added to said first solution. The mixture was then treated under vacuum at 30° C. for 2 hours to free it of the trimethyl amine liberated during the reaction. The reaction mixture was then processed as in Example 1. The yield of the desired hydroxyl amine derivative was 11 g. or 55.5% of theory. Its melting point was 120° C. (with decomposition).

Example 4

27.4 g. (1/10 mol) of 2-ethyl-amino-4-i-propyl-amino-6-trimethylammonium-s-triazine chloride were dissolved in 100 ml. of water at room temperature and a solution of 6.9 g. (1/10 mol) of hydroxyl amine hydrochloride and 16.8 g. (2/10 mol) of $NaHCO_3$ in 100 ml. of water added thereto. The mixture was then treated under vacuum for 2 hours to free it of the trimethyl amine formed during the reaction. The reaction mixture was processed as in Example 1. The yield of the desired hydroxyl amine derivative was 9 g. of 42.5% of theory. Its melting point was 100° C. (with decomposition).

I claim:
1. A compound of the formula

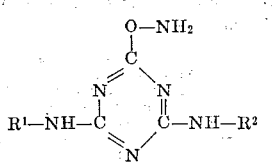

wherein each of R¹ and R² are lower alkyl.

2. A process for the production of a compound according to claim 1 of the formula

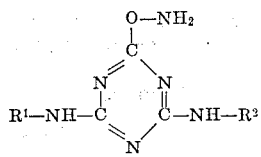

wherein each of R¹ and R² are lower alkyl which comprises reacting a compound of the formula

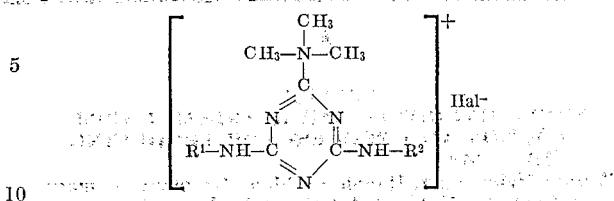

in which R¹ and R² have the same significance as above and Hal is halogen in aqueous solution with at least an equimolar quantity of hydroxyl amine at a temperature between 0° C. and about 50° C.

3. The process of claim 2 in which Hal is chlorine and the reaction is carried out a room temperature.

References Cited

UNITED STATES PATENTS 3,210,339  10/1965  Schwarze et al. _____ 260—249.8

HENRY R. JILES, *Primary Examiner.*

J. M. FORD, *Assistant Examiner.*